US012430055B2

(12) United States Patent
Shknevsky et al.

(10) Patent No.: US 12,430,055 B2
(45) Date of Patent: Sep. 30, 2025

(54) SYSTEM AND METHOD FOR EXPANDING THE LIFETIME OF VIRTUAL ENTRIES IN DATA STORAGE SYSTEMS

(71) Applicant: Dell Products L.P., Round Rock, TX (US)

(72) Inventors: Alexander Shknevsky, Fair Lawn, NJ (US); Vamsi K. Vankamamidi, Hopkinton, MA (US); Uri Shabi, Tel Mond (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/428,161

(22) Filed: Jan. 31, 2024

(65) Prior Publication Data

US 2025/0244899 A1  Jul. 31, 2025

(51) Int. Cl.
*G06F 3/06* (2006.01)

(52) U.S. Cl.
CPC .......... *G06F 3/0641* (2013.01); *G06F 3/0604* (2013.01); *G06F 3/0667* (2013.01); *G06F 3/0679* (2013.01)

(58) Field of Classification Search
CPC .... G06F 3/0604; G06F 3/0641; G06F 3/0667; G06F 3/0679
See application file for complete search history.

(56) References Cited

U.S. PATENT DOCUMENTS

| | | | |
|---|---|---|---|
| 11,093,389 B2 * | 8/2021 | Ding | G06F 3/064 |
| 2010/0274772 A1 * | 10/2010 | Samuels | G06F 16/188 |
| | | | 707/693 |
| 2015/0324281 A1 * | 11/2015 | Takefman | G06F 12/0246 |
| | | | 711/103 |

* cited by examiner

*Primary Examiner* — Larry T Mackall
(74) *Attorney, Agent, or Firm* — Brian J. Colandreo; Heath M. Sargeant; Holland & Knight LLP

(57) ABSTRACT

A method, computer program product, and computing system for expanding the lifetime of virtual entries in a data storage system. A deduplication function of a virtual layer of a data storage system is monitored, a reference count of a virtual entry is incremented when a data page is written to a physical layer of the data storage system and the reference count of the virtual entry is decremented when a data page is deleted from the virtual layer. The virtual entry in the virtual layer is maintained when the reference count reaches a predetermined value and the virtual entry is reclaimed when a predetermined action of the data storage system is to be performed.

11 Claims, 3 Drawing Sheets

SYSTEM AND METHOD FOR EXPANDING THE LIFETIME OF VIRTUAL ENTRIES IN DATA STORAGE SYSTEMS

BACKGROUND

Modern storage systems separate the physical and virtual layers to optimally store physical data in physical layer blocks (PLBs) by leveraging the virtual layer meta data in virtual layer blocks (VLBs). These systems usually ingest data into fast memory like NVRAM and offload the data bind, optimizations, and the actual data movement to its destination (E.g., SSD) in a flush background operation. The VLBs hold virtual entries that describe where the actual physical data resides and all required metadata to support system optimizations for performance and data reduction. To support deduplication as a data reduction technique, the virtual entry holds the reference count for the entry which is incremented for a new page during flush and decremented for an overwritten page during flush or by another background operation. When the virtual entry reaches zero reference count, it indicates the end of life of that virtual entry and then it is reclaimed by the system for future operations. However, such end-of-life processing of virtual entries consumes memory and CPU bandwidth and performance.

SUMMARY OF DISCLOSURE

In one example implementation, a computer-implemented method executed on a computing device may include, but is not limited to, monitoring a deduplication function of a virtual layer of a data storage system, incrementing a reference count of a virtual entry when a data page is written to a physical layer of the data storage system, decrementing the reference count of the virtual entry when a data page is deleted from the virtual layer, maintaining the virtual entry in the virtual layer when the reference count reaches a predetermined value, and reclaiming the virtual entry when a predetermined action of the data storage system is to be performed.

One or more of the following example features may be included. The predetermined value is zero. The predetermined action includes at least one of moving data from the virtual layer, determining physical utilization of the data storage system when the predetermined value is zero, performing a flush operation when the predetermined value is zero, and recovering space in a deduplication index. The method includes reviving the virtual entry when the predetermined action is not to be performed. When a reference count of each of all virtual entries in a virtual layer block (VLB) reach the predetermined value, the VLB is reclaimed. A least recently used (LRU) index of unreclaimed virtual entries is maintained. A first virtual entry in the LRU index for storing a new data entry is reclaimed. The reference count comprises a reportable reference count, which indicates an end-of-life of the virtual entry when it reaches zero.

In another example implementation, a computer program product resides on a computer readable medium that has a plurality of instructions stored on it. When executed by a processor, the instructions cause the processor to perform operations that may include, but are not limited to, monitoring a deduplication function of a virtual layer of a data storage system, incrementing a reference count of a virtual entry when a data page is written to a physical layer of the data storage system, decrementing the reference count of the virtual entry when a data page is deleted from the virtual layer, maintaining the virtual entry in the virtual layer when the reference count reaches a predetermined value, and reclaiming the virtual entry when a predetermined action of the data storage system is to be performed.

One or more of the following example features may be included. The predetermined value is zero. The predetermined action includes at least one of moving data from the virtual layer, determining physical utilization of the data storage system when the predetermined value is zero, performing a flush operation when the predetermined value is zero, and recovering space in a deduplication index. The method includes reviving the virtual entry when the predetermined action is not to be performed. When a reference count of each of all virtual entries in a virtual layer block (VLB) reach the predetermined value, the VLB is reclaimed. A least recently used (LRU) index of unreclaimed virtual entries is maintained. A first virtual entry in the LRU index for storing a new data entry is reclaimed. The reference count comprises a reportable reference count, which indicates an end-of-life of the virtual entry when it reaches zero.

In another example implementation, a computing system includes a memory; and a processor configured to monitor a deduplication function of a virtual layer of a data storage system, increment a reference count of a virtual entry when a data page is written to a physical layer of the data storage system, decrement the reference count of the virtual entry when a data page is deleted from the virtual layer, maintain the virtual entry in the virtual layer when the reference count reaches a predetermined value, and reclaim the virtual entry when a predetermined action of the data storage system is to be performed.

One or more of the following example features may be included. The predetermined value is zero. The predetermined action includes at least one of moving data from the virtual layer, determining physical utilization of the data storage system when the predetermined value is zero, performing a flush operation when the predetermined value is zero, and recovering space in a deduplication index. The method includes reviving the virtual entry when the predetermined action is not to be performed.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
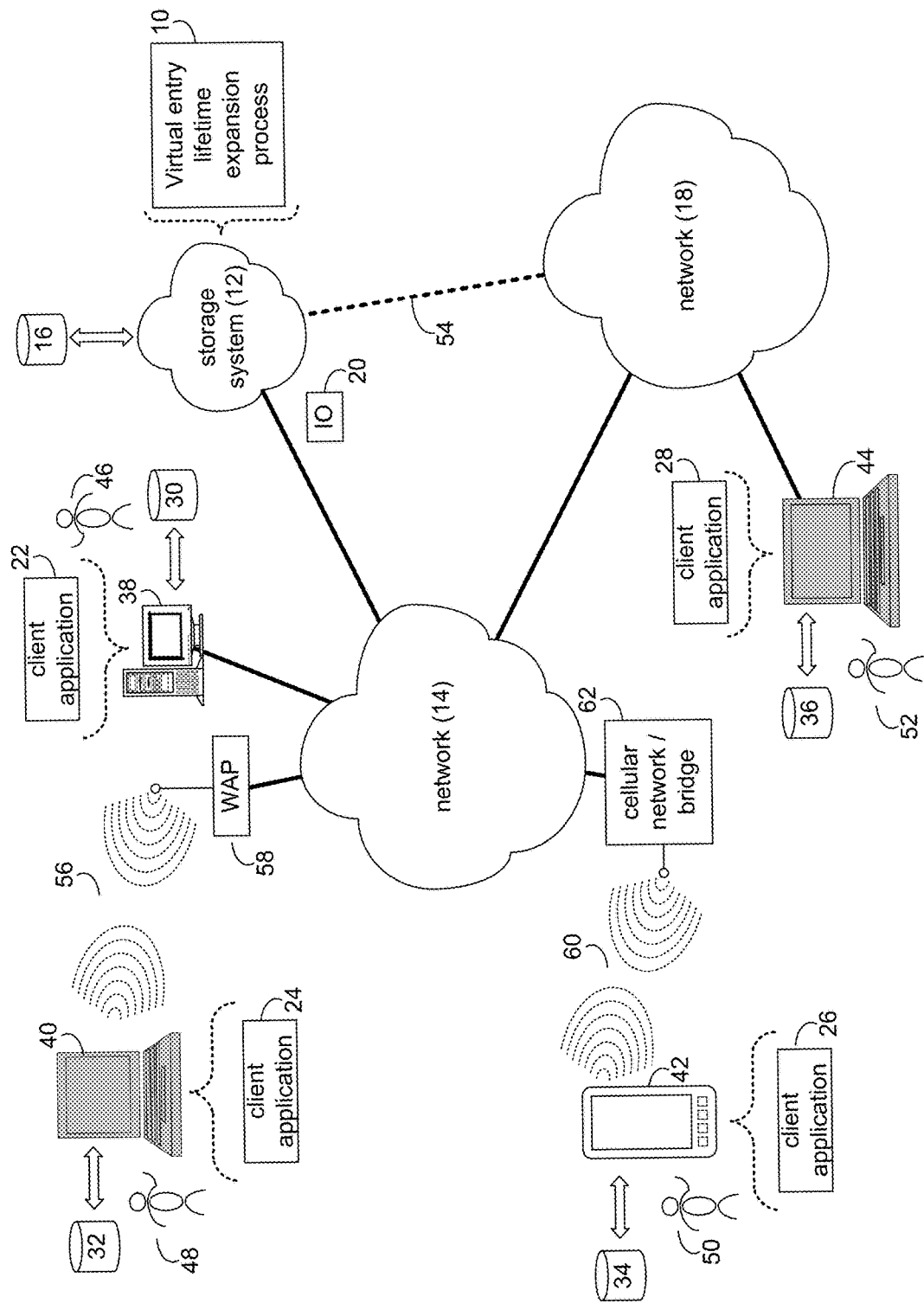
FIG. 1 is an example diagrammatic view of a storage system and a virtual entry lifetime expansion process coupled to a distributed computing network according to one or more example implementations of the disclosure.

System Overview:

Referring to FIG. 1, there is shown virtual entry lifetime expansion process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of disability access assistance process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of disability access assistance process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data deduplication process, such as virtual entry lifetime expansion process 10 of FIG. 1, may include but is not limited to, monitoring a deduplication function of a virtual layer of a data storage system, incrementing a reference count of a virtual entry when a data page is written to a physical layer of the data storage system, decrementing the reference count of the virtual entry when a data page is deleted from the virtual layer, maintaining the virtual entry in the virtual layer when the reference count reaches a predetermined value, and reclaiming the virtual entry when a predetermined action of the data storage system is to be performed.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Virtual Entry Lifetime Expansion Process

Deduplication is ideal for highly redundant operations like backup, which requires repeatedly copying and storing the same data set multiple times for recovery purposes over, for example, 30- to 90-day periods, and virtual machine images. As a result, enterprises of all sizes rely on backup and recovery with deduplication for fast, reliable, and cost-effective backup and recovery. Deduplication segments an incoming data stream, uniquely identifies data segments, and then compares the segments to previously stored data. If the segment is unique, it's stored on disk. However, if an incoming data segment is a duplicate of what has already been stored, a reference is created to it and the segment isn't stored again. For example, a file or volume that is backed up every week creates a significant amount of duplicate data. Deduplication algorithms analyze the data and store only the compressed, unique segments of a file. This process can provide an average of, for example, 10 to 30 times reduction in storage capacity requirements, with average backup retention policies on normal enterprise data. This means that entities can store 10 TB to 30 TB of backup data on 1 TB of physical disk capacity, which has huge economic and performance benefits. Eliminating redundant data can significantly shrink storage requirements and improve bandwidth efficiency. Because primary storage has gotten cheaper over time, enterprises typically store many versions of the same information so that new workers can reuse previously done work. Some operations like backup store extremely redundant information.

Deduplication lowers storage costs as fewer disks are needed. It also improves disaster recovery since there's far less data to transfer. Backup and archive data usually includes a lot of duplicate data. The same data is stored over and over again, consuming unnecessary storage space on disk or tape, electricity to power and cool the disk or tape drives, and bandwidth for replication. This creates a chain of cost and resource inefficiencies within the organization. Deduplication is so powerful because nearly 75 percent of all data that a typical organization stores is a copy. Sending an e-mail attachment to multiple recipients creates a copy of the attachment for every recipient. Cloning virtual machines creates multiple copies of identical operating system images. Many other essential processes create identical copies of data. This is why deduplication technology can be so powerful-simply put, deduplication eliminates the copies. For obvious reasons, writing a single copy to the disk, rather than 100 copies, can save an enormous amount of space. Deduplication makes it appear that the user or application has its own copy. This is essential, because it makes the space savings totally transparent. All existing processes continue to work without modification, while using considerably less storage.

As described above, storage systems separate the physical and virtual layers to optimally store physical data in physical layer blocks (PLBs) by leveraging the virtual layer meta data in virtual layer blocks (VLBs). A PLB refers to the fundamental unit of data organization at the lowest level of the storage hierarchy. The physical layer block size is a crucial parameter influencing storage system performance and efficiency. Data stored in higher-level structures, such as file systems or databases, is ultimately broken down into these physical layer blocks for storage and retrieval operations. The physical layer block size impacts aspects like read and write speeds, storage capacity utilization, and the efficiency of data access patterns.

A VLB is an abstracted and logical segmentation unit designed to enhance data management and organization within a storage system. Unlike traditional physical blocks, a virtual layer block acts as a higher-level, software-defined construct that provides a level of indirection between the actual physical storage media and the applications interacting with the storage system. This abstraction allows for greater flexibility, efficiency, and optimization in handling data. Virtual layer blocks are often employed in storage virtualization and software-defined storage architectures, enabling functionalities such as data deduplication, compression, and tiered storage without exposing the underlying complexities to the applications. This abstraction layer contributes to improved scalability, ease of data migration, and the implementation of advanced storage management features, offering a more adaptive and agile approach to data storage in modern computing environments.

As described above, in order to monitor the lifespan of a virtual entry, also referred to as a "virtual," in a page flush operation, when a new data page is written to memory, a reference count for the virtual entry for that page is incremented. When a page is overwritten, the reference count for the virtual entry is decremented. When the reference count reaches zero, the virtual entry has reached its end of life and is reclaimed to make the virtual entry available for subsequent data storage operations. Maintaining the life cycle of virtuals is very important in storage systems, which usually process the end of life of virtuals once the reference count reaches zero. This process consumes memory, time and CPU and timing is crucial. Usually this is not done during ingest due to performance considerations and not even in the flush background operation, also because of performance consideration. However, this is an important operation because this is the point when the virtual can be reclaimed or even the whole VLB. Thus, usually there is another background operation that process the decrement of the reference counts, which also handles virtuals which reach zero reference count.

When a virtual reaches a reference count of zero, implications for the storage system can include, for example:

Space accounting can be updated to reflect to the user that less virtual space is consumed.

The virtual can be reused. For example, during compact and append (C&A), which happens when a flush operation does not have an empty VLB, and it reuses a partially empty VLB.

In a case in which all virtuals in a VLB reach zero reference count, the entire VLB can be reclaimed, returned to a "free VLBs" list, and then reused as a new empty VLB.

The deduplication index entry can be removed because it cannot be referenced any more.

In accordance with an implementation of the disclosure, when the virtual entry reference count reaches zero, rather than immediately reclaiming the virtual entry, the lifetime of the virtual entry is expanded by leaving it in the system with the reference count equal to zero and reclaiming it only when it is needed for a further storage operation. There are several benefits to this approach: (1) these virtuals could be revived if they suddenly deduped again, (2) time and CPU resources of processing virtual entry end of life when it is not necessary are saved, and (3) these virtual entries can be used as candidates for entries to remove from the dedupe index instead of randomly removing entries.

In the context of the system described above, the existing virtual space is referred to as reportable virtual space, which is space in a VLB that is available for use and is reported to the user as such. "Actual virtual space" is space in the system that is available for use, plus any space that has not yet been reclaimed, but is available to be reclaimed when necessary. In the virtual level, corresponding reference counts are reportable reference count (RRC) and actual reference count (ARC).

Figure 2:
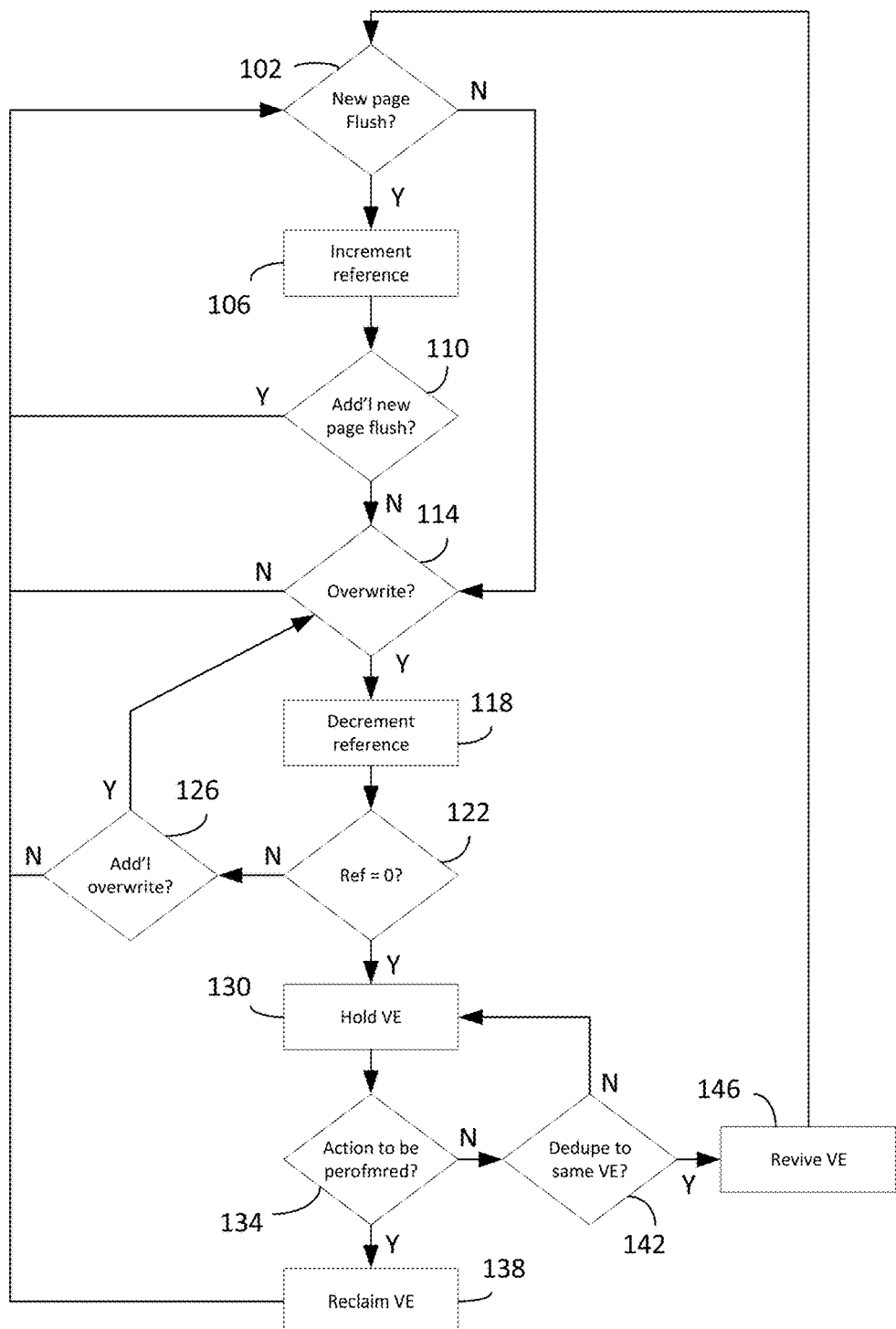
FIG. 2 is an example flowchart of the virtual entry lifetime expansion process according to one or more example implementations of the disclosure.

Referring also to the examples of FIGS. 2 and 3, an implementation of the disclosure will be described. FIG. 2 is a an example flowchart of the virtual entry lifetime expansion process 100 according to one or more example implementations of the disclosure. When a flush operation occurs resulting in a new page being stored in a virtual entry, 102 the reference count RRC for that virtual entry is incremented, 106. If there are additional page flushes occurring and resulting in additional data being stored, 110, 102, the reference count for the virtual entry is incremented, 106. If no further pages are to be stored, 102, 110, the system determines if a flush will result in a page being overwritten, 114. If not, the system returns to 102 and runs through the loop shown by reference numbers 102 through 114. If, at 114, a page is to be overwritten, the reference count for the virtual entry is decremented, 118. If the reference count does not equal zero, 122, and there are n additional pages to be overwritten, 126, the system returns to 102 and runs through the loop shown by reference numbers 102 through 122. If, at 122, the reference count for the virtual entry is equal to zero, the virtual entry is held r maintained without being reclaimed, 130. As described above, by not reclaiming the virtual entry as soon as its reference count equals zero, CPU processing resources and time are preserved.

Assuming the background operation resulting in the decrement of the RRC of a number of virtuals to zero, these virtuals with a reference count RRC of zero may be reclaimed when certain actions are to be performed, 134. These actions include, but are not limited to, moving data from the virtual layer, determining physical utilization of the data storage system when the predetermined value is zero; performing a flush operation when the predetermined value is zero; and recovering space in a deduplication index. After the virtual entry is reclaimed, 138, the process returns to 102 and runs through the process described above. If any of the above actions are not to be performed, 134, and data is not to be deduped to the same entry, 142, for example, by recovering data in the virtual entry, the process moves to 130 and the virtual entry is maintained without reclaiming. If data is to be recovered by deduping it to the same virtual entry, 142, the virtual entry is revived, with the same data intact. The process then proceeds to 102 to continue the virtual entry lifetime expansion process.

Based on the foregoing lifetime expansion process, several data storage operations are benefitted. During a flush, including a compact and append operation which moves referenced data from one PLB to another, while compacting it, and then appends new data, unreferenced virtuals can be reused. In this case, the system can consider a PLB that is referenced by a VLB based on ARC. Reclaimed virtual entries are used first and then the unreclaimed virtual entries are used.

When a VLB completely empties out, it might still include virtuals with an RRC of 0, but where the ARC is greater than zero. These VLBs are not included in a "free" VLB list as they have not yet reclaimed, but rather in a "reclaimable" VLB list. Ideally the system can adequately process the data ingest and flushing by using only the free VLB list, while another background operation, like a garbage collection process, moves VLBs from the reclaimable VLB list to the free VLB list by moving their corresponding data to a more compact PLBs.

Removing the deduplication index entry of a virtual that reached zero reference count RRC is not performed automatically, as this can be a huge impact on the system's data reduction capabilities, especially if there are user data flows which delete and recover large amounts of data. By not removing the entry, new incoming data is allowed to be deduped to the same data again. For example, consider Data X that was deduped 128 times, then it was removed, and then was written again. In an implementation of the disclosure, since the deduplication index of the virtual entry was not removed and the entry was not reclaimed, the virtual entry need only be revived to ingest the same data.

Figure 3:
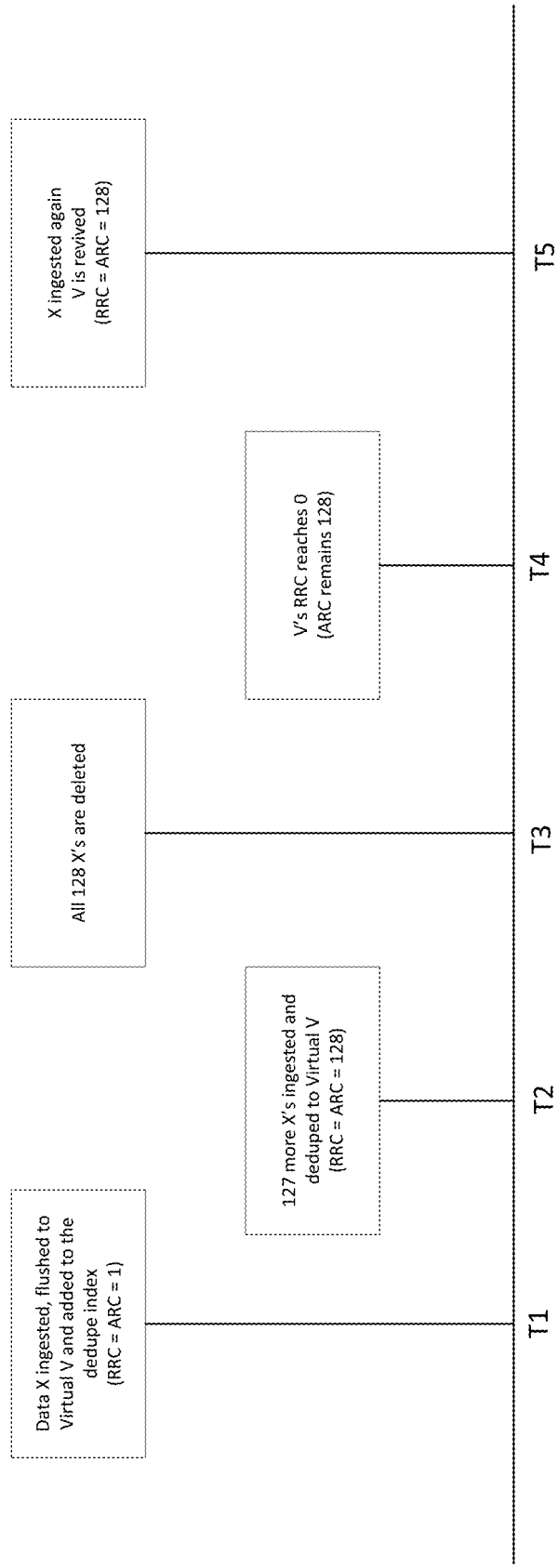
FIG. 3 is an example depiction of an operation of the virtual entry lifetime expansion process according to one or more example implementations of the disclosure.

Referring also to FIG. 3, an example operation of an implementation of the disclosure in which a virtual entry is not reclaimed, in accordance with the process described above, but is revived will be described. At time T1, data X is ingested, flushed into a virtual entry V, and added to the system's dedupe index. At this time, RRC and ARC are equal to 1. At time T2, 127 additional instances of data X are ingested and deduped to virtual entry V. Since the reference counts are incremented with each new data page, at this time, RRC and ARC are equal to 128. At time T3, all 128 instances of data X are deleted from the virtual entry. Since, with each deletion of a data X, the reference count is decremented, at time T4, the RRC of virtual entry V reaches 0. However, since the data remains in the VLB, the ARC remains at 128. When all 128 instances of data X are ingested again at time T5, the virtual entry V need only to be revived and the RRC and ARC are again equal to 128. In an alternative example, once RRC is decremented to 0 at time T4, the virtual entry V may be reclaimed upon execution of a compact and append operation or when a garbage collection operation is performed and data is moved to one or more PLBs.

Leaving these deduplication entries in the index can be a benefit to the system in many instances. However, in some instances the deduplication index may hold so many "unreferenced" entries that the system may not have enough space to store new deduplication entries. This issue can be addressed by maintaining a Least Recently Used (LRU) cache of the entries that are in the index but which can be reclaimed when necessary. Therefore, whenever new data arrives and needs space in the index, the first such "unreferenced" entry can be reclaimed and the new data entry can be stored therein.

Accordingly, an implementation of the disclosure operates to avoid unnecessary processing of end of life of virtuals by postponing the reclaiming process and using the resulting space only as a last resort. As such, the lifetime of virtuals is expanded by leaving them in the system with reference count equal to zero and reclaiming them only as last resort. Benefits to this approach include, but are not limited to, the ability to revive these virtuals if they suddenly deduped again, saving time and CPU resources by not processing end of life of virtuals when it is not necessary, and the unreferenced entries can be used as candidates for entries to remove from the dedupe index instead of randomly removing entries.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14). The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   monitoring a deduplication function of a virtual layer of a data storage system;
   incrementing a reference count of a virtual entry when a data page is written to a physical layer of the data storage system;

decrementing the reference count of the virtual entry when a data page is deleted from the virtual layer;

maintaining the virtual entry in the virtual layer when the reference count reaches a predetermined value, wherein the predetermined value is zero;

determining whether a predetermined action of the data storage system is to be performed;

reclaiming the virtual entry when the predetermined action of the data storage system is to be performed, wherein the predetermined action of the data storage system includes performing a flush operation when the predetermined value is zero; and reviving the virtual entry when the predetermined action is not to be performed.

2. The computer-implemented method of claim 1 wherein when a reference count of each of all virtual entries in a virtual layer block (VLB) reach the predetermined value, the VLB is reclaimed.

3. The computer-implemented method of claim 1 further including maintaining a least recently used (LRU) index of unreclaimed virtual entries.

4. The computer-implemented method of claim 3 further including reclaiming a first virtual entry in the LRU index for storing a new data entry.

5. The computer-implemented method of claim 1 wherein the reference count comprises a reportable reference count, which indicates an end-of-life of the virtual entry when it reaches zero.

6. A non-transitory computer program product residing on a non-transitory computer readable medium having a plurality of instructions stored thereon which, when executed by a processor, cause the processor to perform operations comprising:

monitoring a deduplication function of a virtual layer of a data storage system;

incrementing a reference count of a virtual entry when a data page is written to a physical layer of the data storage system;

decrementing the reference count of the virtual entry when a data page is deleted from the virtual layer;

maintaining the virtual entry in the virtual layer when the reference count reaches a predetermined value, wherein the predetermined value is zero;

determining whether a predetermined action of the data storage system is to be performed;

reclaiming the virtual entry when the predetermined action of the data storage system is to be performed, wherein the predetermined action of the data storage system includes performing a flush operation when the predetermined value is zero; and reviving the virtual entry when the predetermined action is not to be performed.

7. The computer program product of claim 6 wherein when a reference count of each of all virtual entries in a virtual layer block (VLB) reach the predetermined value, the VLB is reclaimed.

8. The computer program product of claim 6 further including maintaining a least recently used (LRU) index of unreclaimed virtual entries.

9. The computer program product of claim 8 further including reclaiming a first virtual entry in the LRU index for storing a new data entry.

10. The computer program product of claim 6 wherein the reference count comprises a reportable reference count, which indicates an end-of-life of the virtual entry when it reaches zero.

11. A computing system comprising:

a memory; and a processor configured to:

monitor a deduplication function of a virtual layer of a data storage system;

increment a reference count of a virtual entry when a data page is written to a physical layer of the data storage system;

decrement the reference count of the virtual entry when a data page is deleted from the virtual layer;

maintain the virtual entry in the virtual layer when the reference count reaches a predetermined value, wherein the predetermined value is zero;

determine whether a predetermined action of the data storage system is to be performed;

reclaim the virtual entry when the predetermined action of the data storage system is to be performed, wherein the predetermined action of the data storage system includes performing a flush operation when the predetermined value is zero; and revive the virtual entry when the predetermined action is not to be performed.

* * * * *